(12) United States Patent
Anbalagan et al.

(10) Patent No.: US 8,972,189 B2
(45) Date of Patent: Mar. 3, 2015

(54) SOCIAL MOBILE SHOPPING SYSTEM

(71) Applicants: Vijeya Aravindan Anbalagan, San Jose, CA (US); Rajeshwari Muthupandian, San Jose, CA (US)

(72) Inventors: Vijeya Aravindan Anbalagan, San Jose, CA (US); Rajeshwari Muthupandian, San Jose, CA (US)

(73) Assignee: eBay Inc., San Jose, CA (US)

( * ) Notice: Subject to any disclaimer, the term of this patent is extended or adjusted under 35 U.S.C. 154(b) by 172 days.

(21) Appl. No.: 13/663,078

(22) Filed: Oct. 29, 2012

(65) Prior Publication Data

US 2014/0121967 A1    May 1, 2014

(51) Int. Cl.
*G01C 21/00* (2006.01)
*G06Q 30/00* (2012.01)

(52) U.S. Cl.
USPC ............... 701/540; 705/14.49; 705/26.1

(58) Field of Classification Search
USPC ............ 701/400–541; 705/14.49, 26.7, 27.1, 705/14.53, 26
See application file for complete search history.

(56) References Cited

U.S. PATENT DOCUMENTS

| | | | |
|---|---|---|---|
| 6,321,158 B1* | 11/2001 | DeLorme et al. ............. | 701/426 |
| 7,974,889 B2* | 7/2011 | Raimbeault .................. | 705/26.7 |
| 2007/0038522 A1* | 2/2007 | Bell et al. ........................ | 705/26 |
| 2007/0055403 A1* | 3/2007 | MacDonald et al. ......... | 700/108 |
| 2014/0019234 A1* | 1/2014 | Cole et al. .................. | 705/14.49 |
| 2014/0136319 A1* | 5/2014 | Sudhakaran ............... | 705/14.53 |

\* cited by examiner

*Primary Examiner* — Muhammad Shafi
(74) *Attorney, Agent, or Firm* — Haynes and Boone, LLP (57) ABSTRACT

Methods and system are provided for enhancing consumer shopping. The methods and systems allow consumers to more readily purchase products of interest to them. The consumers' ability to shop effectively and efficiently is enhanced while a payment provider, such as PayPal, Inc., and/or an online seller, such as eBay, is given a mechanism for recruiting new users. For example, a user's online searches and/or stored shopping list can be used to determine which products the user is interested in purchasing and the availability of at least some of these products can be provided to the user, along with directions to the nearest POS brick-and-mortar stores where the products can be purchased.

21 Claims, 4 Drawing Sheets

SOCIAL MOBILE SHOPPING SYSTEM

BACKGROUND

1. Technical Field

The present disclosure generally relates to electronic commerce and, more particularly, relates to methods and systems for social point-of-sale (POS) mobile shopping.

2. Related Art

Consumers often shop while traveling. For example, consumers can shop while traveling around town or while traveling on vacation. Frequently, consumers make lists of items to purchase while doing such traveling. However, the lists typically do not indicate where to purchase specific items or how to locate the merchants selling these items. Typically, no check for availability of items to be purchase is performed. Thus, time can be wasted when a consumer makes a stop to purchase an item that is unavailable.

Further, opportunities to purchase desired products are commonly overlooked while traveling. Products can be available and convenient to purchase along the way, but the consumer can be completely unaware of such opportunities to purchase the products. Thus, the consumer can miss opportunities to conveniently purchase desired products and can waste time, money, gasoline, and effort driving around and shopping for the products in a substantially random (or at least poorly organized) manner.

Routing between stops to purchase or look for products can be sub optimal or even erratic. Although consumers may somewhat intuitively plan their routes, such routes are not necessarily the best routes. Indeed, consumers can get lost while attempting to locate merchants in unfamiliar areas.

DETAILED DESCRIPTION

Methods and systems are provided for enhancing consumer, e.g., user, shopping. Such methods and system can enhance user shopping when the user is traveling. The methods and systems can allow users to more readily and conveniently purchase products of interest to them. The ability of a user to shop effectively and efficiently is enhanced. At the same time, a payment provider, such as PayPal, Inc., and/or an online seller (particularly an online seller having a point-of-sell (POS) presence), such as eBay, can be given a new mechanism for recruiting users. Such payment providers can facilitate payment for both online and brick-and-mortar merchants. Such online sellers can increase their sales, both at POS presences and online.

According to an embodiment, a social mobile shopping system can provide personalized product recommendations. The personalized product recommendations can be for products that the user is likely to want to purchase. The personalized product recommendations can be for purchases to be made at nearby brick-and-mortar stores. The availability of the recommended products can be determined in advance, such that only those stores having the products presently in stock are recommended to the user.

According to an embodiment, a hold can be put on a recommended product to assure that the recommended product is still at the store when the user arrives. For example, the merchant can set the recommended product aside so that it is not sold to someone else. The user can indicate to the social mobile shopping system that the user desires to purchase the recommended product. The social mobile shopping system can notify the merchant of the user's desired to purchase the recommended product and the merchant can put the hold on the recommended product so that the recommended product is available for purchase by the user when the user arrives at the store.

For example, the social mobile shopping system can be used to place a recommended product on reserve or hold at a POS terminal of an online seller, such as eBay. This can be done using a payment provider feature, such as by using PayPal Access to enter the recommended product on a priority list so that the user can later perform a store pickup of the recommended product.

According to an embodiment, a recommended product can be displayed on a screen of the user's mobile device when the user takes a predefine action, such as when the user taps a merchant location on the screen or moves a cursor over the merchant location. The user can simply click on the displayed product to purchase the product, with or without a confirmation by the user. The product can then be picked up by the user while the user is en route during travel, e.g., during the shopping trip. Payment for the product can be accomplished automatically, such as via a payment provider account of the user.

According to an embodiment, a social mobile shopping system can comprise one or more memories that store information regarding searches, such as mobile searches performed by the user. The social mobile shopping system can further comprise one or more processors operable to access the information regarding mobile searches, mine the information regarding mobile searches to identify products, determine an affinity of the user for each of the products, determine an availability of the products having an affinity greater than a predetermined level, and send a communication for display on a user device, such as a cellular telephone of the user. The communication can include information regarding the availability of the products having the affinity greater than the predetermined amount. The communication can include a recommendation for purchasing such products. The searches can be mobile searches, e.g., searches performed using a mobile device, or can be non-mobile searches such as searches performed using a non-mobile device like a desktop computer.

According to an embodiment, only those products which are presently being sold by merchants near the user or by merchants that are expected to be near the user in the future (such as due to travel by the user) can be recommended. The determined affinity for the products and the convenient availability of the products can provide a reliable and effective basis for making such product purchase recommendations.

Determining the affinity of the user for each of the products can comprise using an API. For example, determining the affinity of the user for each of the products can comprise using a personalized recommendation API, such as a Hunch API.

Hunch is an application programming interface (API) that provides personalized recommendations, such as for products to purchase. Thus, Hunch can provide recommendations that are specifically tailored for the tastes, interest, preferences, and desires of a particular person. Hunch attempts to determine an affinity of a person for a product. The affinity can be expressed as a taste graph. For example, if a person has indicated an interest in nature on a social network, then Hunch can attempt to provide useful movie recommendations based upon the indicated interest in nature. Examples of social networks include Twitter, Facebook, and MySpace.

The Hunch API can provide a taste graph. The taste graph can be available for review by the user. Such review by the user may facilitate fine tuning of the API, such that in the future the API can better determine the affinity of the user for products. For example, the user can review the taste graph and inform the social mobile shopping system of any changes that should be made to the taste graph regarding the user's affinity for products thereon. Such user made comments regarding the taste graph can be used to vary parameters used by the social mobile shopping system to generate new taste graphs in the future. For example, if concert tickets are ranked higher on the taste graph than sports event tickets (indicating that the user tends to prefer concerts to sporting events) and the user disagrees with this assessment, then the user can modify the taste graph or otherwise indicate that the user tends to prefer sporting events to concerts.

Determining the availability of the products having an affinity greater than a predetermined level or threshold can comprise using an API. The availability only needs to be determined for those products that the user is likely to want to purchase, based upon the determined affinity for the products and based upon the threshold.

For example, determining the availability of the products having an affinity greater than a predetermined level can comprises using a product availability API, such as a Milo API to determine the availability of the recommended products. The API can also provide pricing information. The pricing information can be used, at least in part, to determine which store locations are to be shopping stops. Preference can be given by the social mobile shopping system to locations nearer to the user, to locations near to a route to be traveled by the user, and/or to locations having lower prices for recommended products.

Milo is an application programming interface (API) that provides access to information regarding the local availability of products from brick-and-mortar stores. Thus, with Milo a user can determine whether or not a specified product is available at a nearby store. For example, if the user wants to purchase a particular cell phone, then Milo can tell the user which, if any, of the stores near the user presently have the cell phone in stock.

The availability can be for products sold by merchants within a predetermined area. The predetermined area can be defined by the user. The predetermined area can be defined by the user during a set up process for the social mobile shopping system or can be defined by the user substantially in real time. For example, during the set up process, the user can specify a distance from the user (such as two miles) that the user is willing to travel to purchase products, can specify one or more cities within which the user is willing to travel to purchase products, and/or can specify the predetermined area in any other desired manner. The user can also specify one or more destinations and the social mobile shopping system can define a route to the destination(s) having shopping stops along the route, along with a distance or distances the user is willing to travel outside the route, e.g., by minutes or distance.

As a further example, the user can be queried by the processor(s) regarding how far the user is willing to travel to purchase products generally or to purchase a specified product. In any instance, the social mobile shopping system can effectively integrate the user's shopping needs with the user's personal travel plans to determine a personalized travel and shopping plan for the user.

The user can prioritize products, such that the social mobile shopping system will allow more costs to be associated with higher priority items. The costs can include money, time, and distance. Thus, a trip can be defined that causes the user to travel further out of the way and/or to pay a higher purchase price for higher priority products.

The trip can be planed so that the user can make desired stops, e.g., can eat at preferred restaurants and/or stop at preferred sites (such as historic landmarks, national parks, theme parks or any other desired places to stop). Preferred types of restaurants or other stops can be designated by the user, such as during the social mobile shopping system set up process. Preferred restaurants can be defined by user history or by affinity of the user for the restaurants as determine by an API, such as Hunch. For example, if the user's payment provider history shows that the user frequently eats at Denny's, Coco's, and In-and-Out Burger, then the trip can be planned to facilitate meals at these restaurants. Indeed, meals, gas, hotels, and the like can be products that are recommended by the social mobile shopping system.

Specific stops along a travel route can be designated by the user when the user enters the destination(s). For example, such stops can be entered as destinations. Specific stops along the travel route can be designated by the user after the user enters the destination(s) and after the social mobile shopping system provides the route to the user. Thus, specific stops along the travel route can be entered as modifications to an existing route.

The processor(s) can be further operable to determine a location of the user from a global positioning system (GPS) of a user mobile device. The availability can be for products sold by merchants within a predetermined distance of the location of the user. The user can define the predetermined distance, such as a set up process of the social mobile shopping system.

The processor(s) can be further operable to determine a route for a trip of the user. The availability can be for recommended products sold by merchants along the route. The products can be obtained from a shopping task list of the user, can be mined from searches made by the user, can be specified or otherwise provided by the user or anyone else, or the products can be obtained from any other source. For example, the social mobile shopping system can access the user's shopping task list using an Android authentication token when the user has an Android cellular telephone and provides authorization for the social mobile shopping system to have such access. The searches can be searches of the Internet, such as by using a search engine such as Google.

According to an embodiment, a method can comprise storing, in one or more memories, information regarding mobile searches performed by the user. The method can further comprise accessing, electronically via one or more processors, the information regarding mobile searches. The method can further comprise mining, electronically via the processor(s), the information regarding mobile searches to identify products. The method can further comprise determining, electronically via the processor(s), an affinity of the user for each of the products. The method can further comprise determining, electronically via the processor(s), an availability of the products having an affinity greater than a predetermined amount. The method can further comprise sending, electronically via the processor(s), a communication to the user including the availability of the products having an affinity greater than the predetermined amount.

According to an embodiment, a computer program product can comprise a non-transitory computer readable medium. The non-transitory computer readable medium can have computer readable and executable code for instructing one or more processors to perform one or more of the methods described herein.

The social mobile shopping system can provide the locations of merchants having the best prices. Prices among competing merchants can be determined and the best deal can be provided to the user. Prices can be weighed against other factors, such as convenience or distance. For example, if one merchant is slightly closer to the desired route of the user and sells a particular product for higher price than another merchant that is further away from the desired route, the route can be changed if the price difference is great enough. The user can put a dollar value on the user's time, such as during a set up process of the social mobile shopping system, to facilitate such functionality. Thus, if the new route adds twenty minutes to the trip, a dollar value can be put on this time due to the cost of gasoline and the value of the user's time. When this dollar value is less than the amount of money saved by purchasing the product from the more distant merchant, then the route can be changed to include the more distant merchant.

When a desired product is unavailable locally or along a route for a trip of the user, then the user can be given an opportunity to purchase the product online, such as via eBay. The user can select any of the recommended products for purchase online Thus, the user can be presented with the best opportunity to purchase products from brick-and-mortar stores while also be provided the option to purchase the products online.

The social mobile shopping system can provide recommendations to the user regarding whether to purchase products from brick-and-mortar stores (such as locally or while on a shopping trip) or to purchase the products online. The recommendations can be based on pricing, cost to the user (include travel cost and the value of the user's time for purchasing from brick-and-mortar stores) or any other desired criteria. For example, the user may simply prefer to purchase from brick-and-mortar stores and may therefore more heavily weight such purchases.

According to an embodiment, social information can be used, at least in part, to determine what a user would like to purchase. The social information can be obtained from one or more social networks. The social networks can be used to determine what products to recommend for purchase and to trigger a buzz regard such products. The social networks can create or enhance interest in such products. This interest can be based, at least in part, upon the user's implicit or explicit interest in the products.

The social buzz can be generated, at least in part, by posting the details of recommended purchases and/or any actual purchases on social networks. For example, the details of recommended purchases and/or the actual purchases can be posted on the user Facebook Wall using Facebook Check-In API. The user can provide authorization for such posting in a set up process of the social mobile shopping system.

The social network can instigate effective competition among merchants who sell the recommended product. For example, such merchants can be notified of the desire to purchase the product (by the user and by others who have been stimulated by the social buzz) and can be invited to entice users to purchase the product from their store. Users can be enticed to purchase the product by price competition amount the merchants. For example, merchants can communicate their prices to the interested users and can modify, e.g., lower, their prices in response to seeing the prices offered by other merchants.

Figure 1:
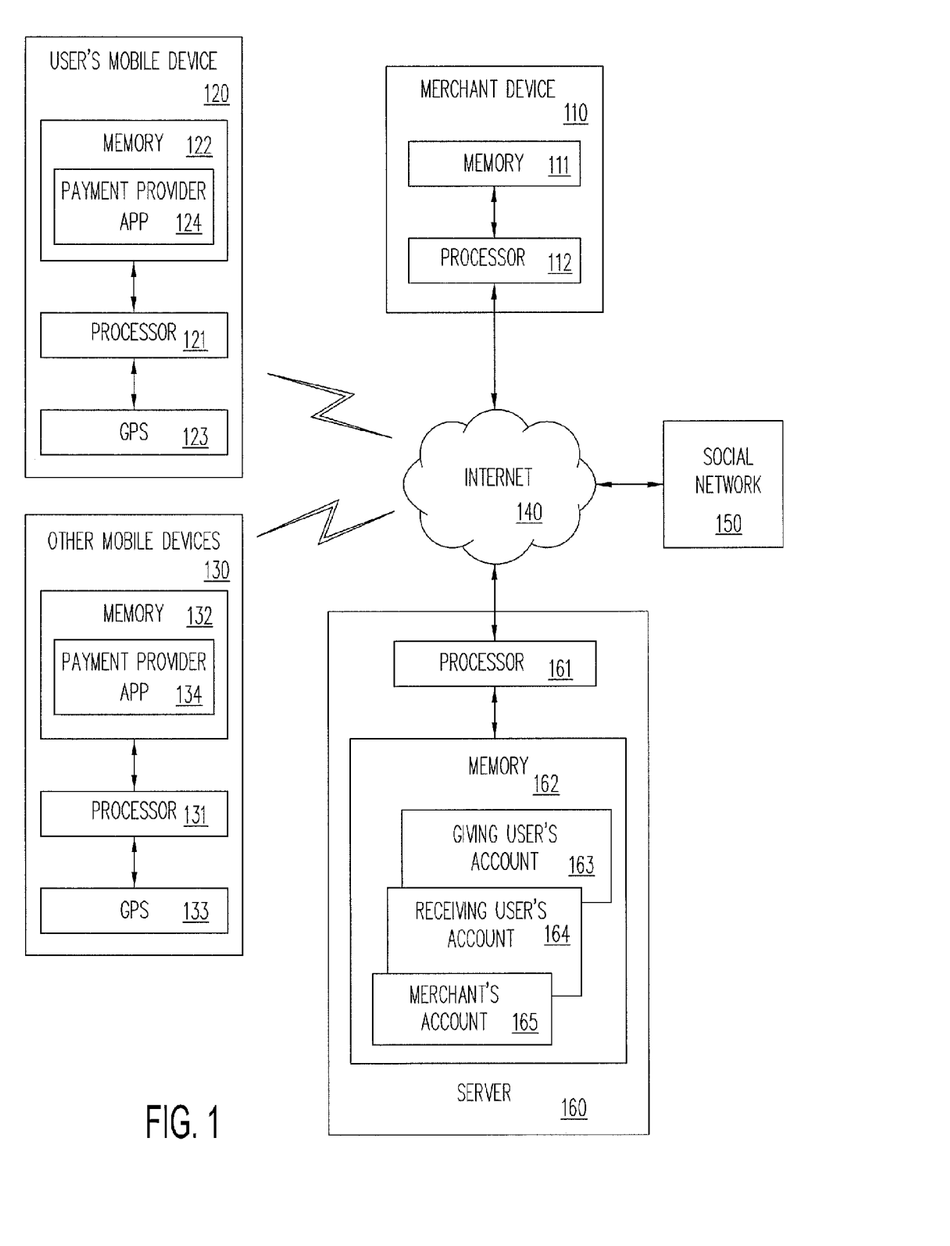
FIG. 1 is a block diagram of a social mobile shopping system, according to an embodiment.

FIG. 1 is a block diagram of a social mobile shopping system, in accordance with an embodiment. The social mobile shopping system can include a merchant device 110. The merchant device 110 can be a merchant checkout terminal, a computer, and/or a server, for example. The merchant device 110 can include a memory 111 and a processor 112. The merchant device 110 can be used to facilitate purchases (such as PUS purchases by the user at the store) and to provide information regarding the purchases (such as to a server 160). The merchant device 110 can be used by the merchant to receive information from the social mobile shopping system, such as a request to hold a specified product for a user. The merchant device 110 can be used to practice the social mobile shopping system, as discussed herein.

The social mobile shopping system can include a user's mobile device 120. The user's mobile device 120 can be carried by the user. The user's mobile device 120 can be a cellular telephone, a smart telephone, a hand held computer, a laptop computer, a notebook computer, or a tablet computer, for example. The user's mobile device 120 can include a processor 121, a memory 122, and a global positioning system (GPS) 123. The mobile device 120 can be used for Internet searching, such as searching information regarding products of interest to the user. The user's mobile device 120 can be used to search for and/or purchase products online. The user's mobile device 120 can be used to practice the social mobile shopping system, as discussed herein.

An app 124 can be stored in the memory 122 of the user's mobile device 120 and the app 124 can be executed by the processor 121 of the user's mobile device 120. The app 124 can be used in the practice of the social mobile shopping system, as described herein.

The social mobile shopping system can include a plurality of other mobile devices 130. The other mobile devices 130 can be carried by other users. The other mobile devices 130 can be cellular telephones, smart telephones, hand held computers, laptop computers, notebook computers, or tablet computers, for example. The other mobile device 130 can similarly include a processor 131, a memory 132, and a global positioning system (GPS) 133. An app 134 can be stored in the memory 132 and executed by the processor 131. The app 134 can be used in the practice of the social mobile shopping system described herein.

The other mobile devices 130 can be used for Internet searching, such as searching information regarding products of interest to the user. The other mobile device 130 can be used to search for and/or purchase products online. The other mobile devices 130 can be used to create a stir regarding a product via a social network, as discussed herein. The other mobile devices 130 can be used in other aspects of the practice of the social mobile shopping system, as described herein.

An app 134 can be stored in the memory 132 of the other mobile devices 130 and can be executed by the processor 131 of the other mobile devices 130. The app 134 can be used to create a stir regarding a product via a social network, as discussed herein. The app 134 can be used in the practice of the social mobile shopping system, as described herein.

The social mobile shopping system can include a server 160. The server 160 can be a server of a payment provider, such as Paypal, Inc. The server 160 can be a server of an online seller, such as eBay. The server 160 can be a server of a search engine, such as Google. The server 160 can be one or more servers of any entity or combination of entities. The server 160 can be dedicated for use with the social mobile shopping system or can also be used for other purposes. The server 160 can store information, such as Internet search information, online purchase information, and/or payment provider information of the user.

The server 160 can be a single server or can be a plurality of servers. The server 160 can include one or more processors 161 and a memory 162. The memory 162 can be a memory of the server 160 or a memory that is associated with the server 160. The memory 162 can be a distributed memory. The memory 162 can store a user account 163 and a merchant account 164.

The merchant device 110, the mobile device 120, the other mobile devices 130, the social network 150, and the server 160 can communicate with one another via a network, such as the Internet 140. The merchant device 110, the mobile device 120, the other mobile devices 130, the social network 150, and the server 160 can communicate with one another via one or more networks, such as local area networks (LANs), wide area networks (WANs), cellular telephone networks, and the like. The merchant device 110, the mobile device 120, the other mobile devices 130, the social network 150, and the server 160 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system, e.g., a social mobile shopping system, for implementing one or more processes described herein. As shown, the network-based system may comprise or implement a plurality of servers 160 and/or software components that operate to perform various methodologies in accordance with the described embodiments. Exemplary servers 160 may include, for example, stand-alone and enterprise-class servers operating a server OS such as a MICROSOFT® OS, a UNIX® OS, a LINUX® OS, or another suitable server-based OS. It can be appreciated that the servers 160 illustrated in FIG. 1 may be deployed in other ways and that the operations performed and/or the services provided by such servers 160 may be combined or separated for a given implementation and may be performed by a greater number or fewer number of servers 160. One or more servers 160 may be operated and/or maintained by the same or different entities.

Figure 2:
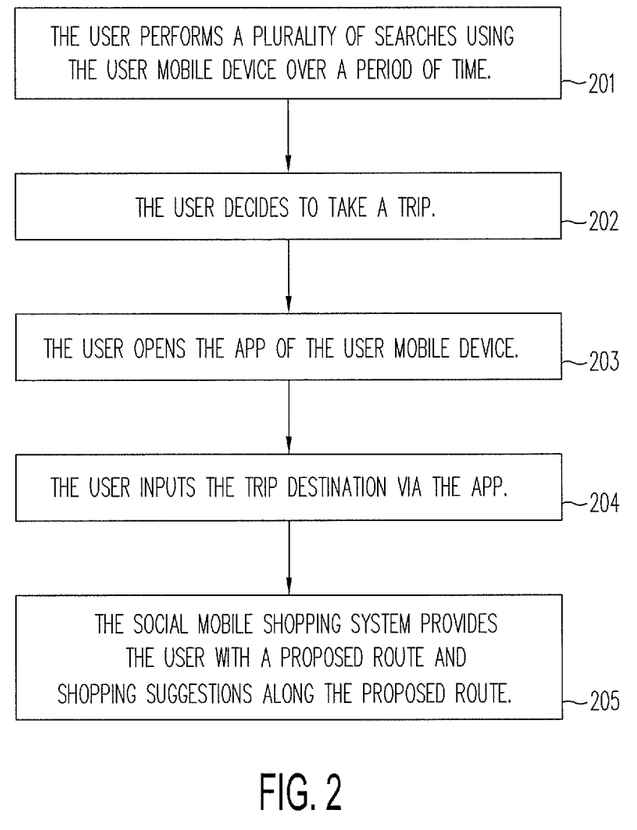
FIG. 2 is a flow chart showing a method for operating the social mobile shopping system, according to an embodiment.
Figure 3:
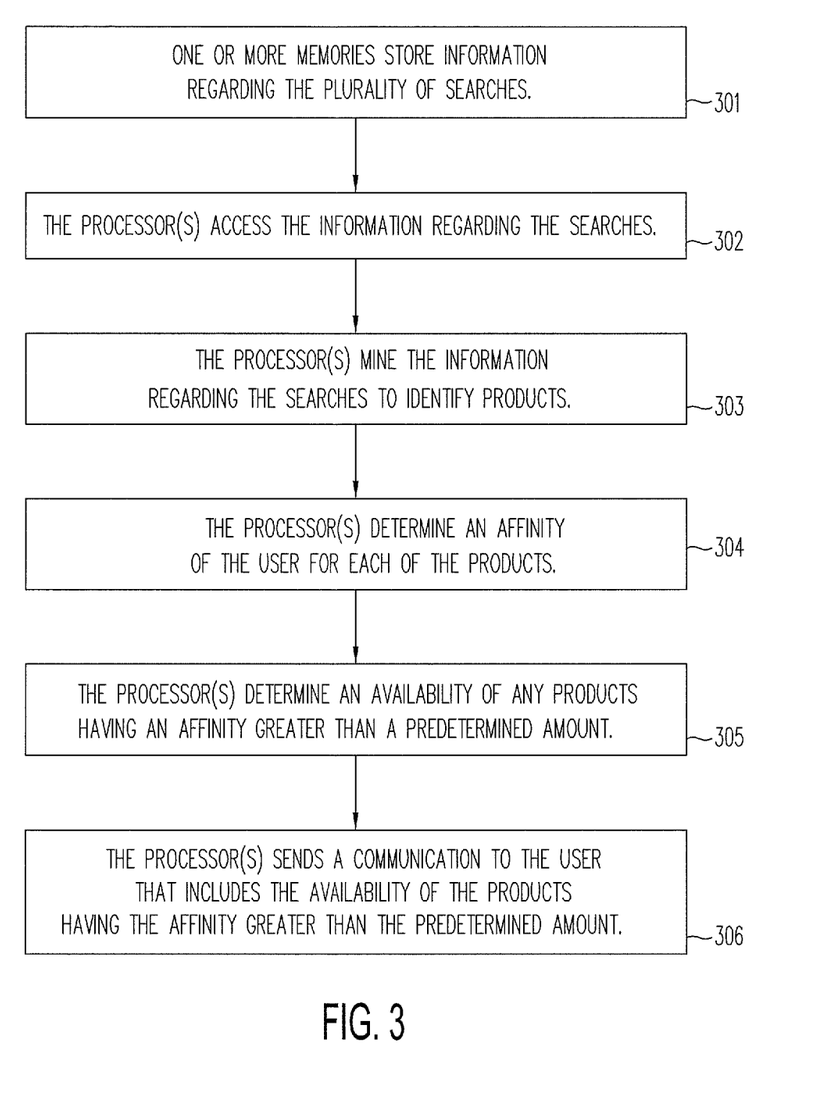
FIG. 3 is a flow chart showing further detail of the method for operating the social mobile shopping system, according to an embodiment.

FIGS. 2 and 3 are flow charts that describe examples of operation of the social mobile shopping system according to embodiments thereof. Note that one or more of the steps described herein may be combined, omitted, or performed in a different order, as desired or appropriate.

FIG. 2 is a flow chart showing a method for operating the social mobile shopping system, according to an embodiment. The user can perform a plurality of searches using the user mobile device 120 over a period of time, as shown in step 201. The searches can be for products, can be related to products (such as for information regarding features, pricing, and/or availability of products), or can be unrelated to products. The searches can be performed via the user's mobile device or any other device that is registered with or known to the social mobile shopping system. There can be any number of searches. For example, there can be one search, ten searches, one hundred searches, one thousand searches, or more searches. The searches can be any kind of searches performed in any manner for any subject matter.

The user can decide to take a trip, as shown in step 202. The trip can be local or non-local. The trip can be a short trip or a long trip. The trip can be for day or can take a plurality of days. The trip can be one way or can be a round trip. The trip can be by car, bus, railroad, airplane, boat, or any other vehicle or combination of vehicles. For example, the trip can be a short, e.g., two hour, shopping trip about the user's town in the user's car. As a further example, the trip can be a weeklong vacation in another country that includes taxi rides, airplane rides, and boat rides.

The trip can be a walking trip. For example, the trip can be a walking trip around the user's neighborhood, around the downtown area of the user's city, or around a shopping mall. Generally, the trip can be any type of trip, of any distance, using any means of transportation, and at any location or number of locations.

In any instance, the user can desire to make purchases along the way of the trip. Such purchases can be made on the way to the destination, on the way home from the destination, or on one or more side trip with respect to the destination. There can be one or more destinations. There can be no clearly defined destination. For example, shopping stops made while on the trip can define the destinations.

The user can open the app 124 of the user mobile device 120, as shown in step 203. The user can open the app 124 by selecting an icon displayed on a screen of the mobile device 120. The app 124 can have other functionality. For example, the app 124 can be a payment provider app that facilitates various payment related functions with the payment provider. The app 124 can already be open for other functionality and the user can select "Enter Trip Destination" from within the app 124 to enter the destination. The app 124 can respond by asking the user if the user would like to make this a shopping trip. The app 124 can respond by defining the shopping trip.

The user can input the trip destination via the app 124, as shown in step 204. The destination can be type in, selected from favorites, or selected on a map. The destination can be entered in any desired manner. If there is no clearly defined destination, then the user can merely input one or more stops along the route.

The social mobile shopping system can provide the user with a proposed route and shopping recommendations along the proposed route, as shown in step 205. The shopping recommendations can be for products that the social mobile shopping system has determined that the user would like to purchase. For example, the shopping recommendations can be for products that the social mobile shopping system has determined that the user has a high affinity for according to an algorithm, such as that of the Hunch API.

The shopping recommendations can be displayed as a list or a map. A map can be displayed on the user device 120 and can be tagged to shop the shopping locations. Each tag can be dynamic, e.g., can changes as the user's shopping list changes and/or as the availability of products change. Voice alerts can inform the user of such product changes. Driving directions to each tagged shopping location can be provided. The driving directions can be audible.

The proposed route can be a shortest route, a quickest route, or a most scenic route. The route can tend to be optimized for any desired criteria of the user. For example, the user can specify desired type of stops (such as art galleries, museums, historic landmarks, particular restaurants, etc.) along the route and the route can tend to be optimized to include the desired stops along with shopping stops.

The social mobile shopping system can provide the user with a plurality of different proposed routes and shopping recommendations along each of the proposed routes. The different proposed routes can be ranked. For example, the proposed routes can be ranked according to their length, time of travel, number of products recommended for purchase there along, dollar value of products recommended for purchase there along, total affinity of products recommended for purchase there along, and/or average affinity of products recommended for purchase there along.

The social mobile shopping system can provide the user with a list of products that can readily be purchased on the trip. The list can include the dollar cost of each product. The list can include the time and/or distance associated with the purchase of each product. That is, the list can include the time that would be saved and/or the distance that would not have to be traveled if a particular product or a group of products were to be deleted from the list, e.g., not purchased by the user while on the trip. Thus, the user can better determine the impact, e.g., money and time savings, of removing an item from the list.

The list can be modified by the user. Products can be added to the list and/or removed from the list. For example, the list can be modified by the user to conform to a budget of the user and/or to conform to priorities of the user regarding the purchase of products on the list. The budget can be a money budget and/or a time budget, for example. When products are removed from the list, the user can automatically be given an opportunity to purchase the products online, such as via eBay. The user can set up the social mobile shopping system so that when products are removed from the list, the removed items are automatically ordered online, such as from the vendor offering the best terms, e.g., lowest cost of the products including tax and shipping.

Routing can be modified by the user. Shopping stops along the route can be added and/or removed from the route. For example, the route can be modified by tapping a map on the screen of the user's mobile device 120 at an existing shopping stop to remove the existing stop or by tapping the map where there is no existing shopping stop to add a shopping new stop. When a new stop is added, the social mobile shopping system can check on the availability of products at or near the new stop. For example, when an existing shopping stop is deleted and a new shopping stop is added, the social mobile shopping system can check on the availability of products at the new shopping stop for any products that were potentially to be purchased at the deleted shopping stop.

The user can tap a location of a shopping stop on the screen of the user's mobile device 120 to see products that can be purchased that the selected shopping stop. The products that can be purchased that the selected shopping stop can be listed or otherwise displayed. For example, pictures of the products can be shown. Tapping the name of a product on the list or the picture of the product can provide further information regarding the product. For example, the further information can include pricing, features, and/or discounts that are available.

One or more products can be selected from the list or the map. The selected products can be deleted from the list and/or ordered online. Other products can be added to the list or the map. For example, the user can recall and add one or more products that were deleted from a previous list and add those products to the present list.

A total dollar cost of products can be displayed. The map or the list of products can be displayed along with the total dollar cost such that the user can select and de-select products to help the user determine which products to purchase. The total dollar cost can vary as the user selects and de-selects products to reflect the total dollar cost of only the selected products. The total dollar value of all products (those that are selected and those that are de-selected) can be displayed to show the amount of money being saved as the user de-selects products.

The total cost of travel for the trip can be displayed on the user's mobile device 120. The total cost of travel for the trip can include gas, airline tickets, meals, hotels, products purchased, and any other costs that the user wants to include. The total cost of the trip can include the costs that would be incurred if all of the products are purchased. Products can be selected and deselected as discussed herein to determine their impact on the total cost.

FIG. 3 is a flow chart showing further detail of the method for operating the social mobile shopping system, according to an embodiment. One or more memories can store information regarding the plurality of searches, as shown in step 301. The memories can include the memory 122 of the user's mobile device 120, a memory of a search engine such as Google, and/or a memory 162 of a server 160 such as a payment provider server or an online seller. The memories can be any memories that can provide information regarding products that the user may be interested in purchasing. The memories can include information such as search requests, search results, wish lists (such as an eBay wish list), shopping task lists (such as an Android shopping task list), online purchases, brick-and-mortar store purchase, appointments, and the like.

The processor(s) 161 can access the information regarding the searches and any other available information, as shown in step 302. The processor(s) 161 can access the information via a network, such as the Internet. The processor(s) 161 can access the information in any desired manner. The processor(s) 161 can be any processors of any device or combination of devices.

The processor(s) 161 can mine the information to identify products, as shown in step 303. The processor(s) 161 can look for key words, such as the names or model numbers of products, the manufacturers of products, the sellers of products, and the like. The processor(s) 161 can look for searches on the web pages of merchants to find products. The processor(s) 161 can look at wish lists and/or shopping task lists to identify products.

The processor(s) 161 can determine an affinity of the user for each of the products, as shown in step 304. For example, the processor(s) 161 can use the Hunch API and any available information regarding the user to determine an affinity of the user for each of the products. Information regarding the user that can be used to determine the affinity for each of the products can be provided by the user, such as during a set up process for the social mobile shopping system.

A limit or predetermined amount can be established regarding the affinity of the user for the products. The predetermined amount can provide a threshold below which the affinity is insufficient to indicate a worthwhile interest in the product and above which the affinity is sufficient to indicate a worthwhile interest in the product. Thus, an affinity above the threshold can indicate that the user is likely to want to purchase the product.

The predetermined amount can be provided by the user in a set up process. The predetermined amount can be modified substantially in real time. In this manner, the predetermined amount can be refined such that more appropriate products are recommended by the social mobile shopping system. For example, when the user agrees with a suggestion, the user can indicate such agreement to the social mobile shopping system and when the user disagrees with a suggestion, the user can indicate such disagreement to the social mobile shopping system.

The processor(s) 161 can determine an availability of any of the products which have an affinity greater than a predetermined amount, as shown in step 305. The availability of the products can be determined, at least in part, via the Milo API. The availability of the products can be determined by querying inventories of merchants. The availability of the products can be determined from web sites of merchants. The processor(s) 161 can send a communication to the user that includes the availability of the products having the affinity greater than the predetermined amount, as shown in step 306.

The affinity can be based upon a taste graph of the products. The taste graph can be formed according to the Hunch API, can use criteria defined by administrators of the social mobile shopping system, or can user criteria defined by the user. For example, the user can determine that higher affinities are to be assigned to products that are searched more times, more often, and/or more recently. As a further example, the user can determine that higher affinities are to be assigned to products that are more consistent with predefined interests of the user (such as movies, sports, or music).

In implementation of the various embodiments, embodiments of the invention may comprise a personal computing device, such as a personal computer, laptop, PDA, cellular phone or other personal computing or communication devices. The social mobile shopping, the online shopping system, and/or the payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
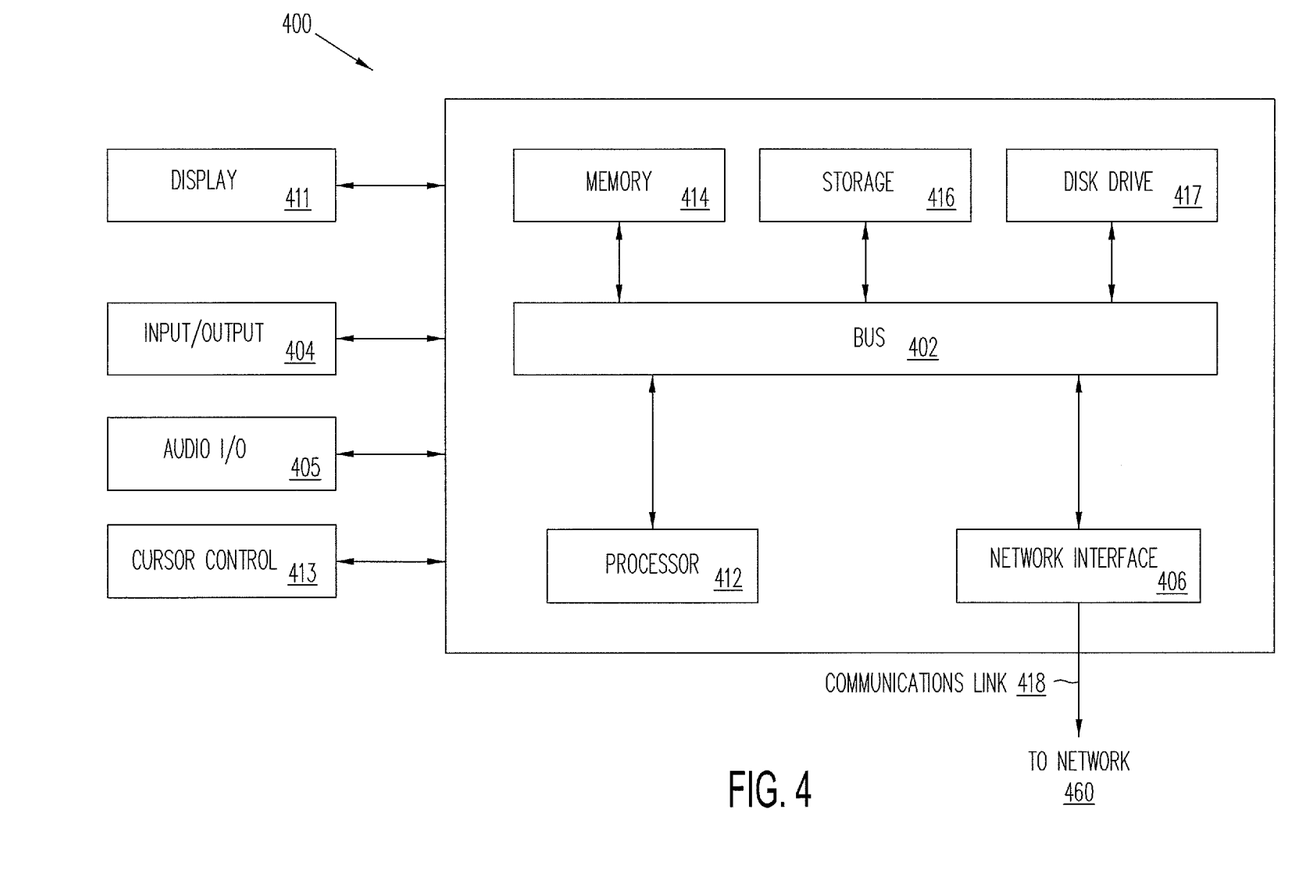
FIG. 4 is a block diagram of an example of a computer that is suitable for use in the social mobile shopping system, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

According to an embodiment, an intuitive, proactive and social POS shopping mobile application can motivate the user to obtain personalized product recommendations for shopping at nearby POS stores and can trigger a social buzz to instigate effective competition. Hunch APIs can be used to provide personalized product purchase recommendations, for example. Milo APIs can be used to provide the POS store details (such as product availability and pricing) and driving directions, such as from a user's current location.

According to an embodiment, user-authorized mining of the user's mobile search for products can be performed. A relevant taste graph can be made, such as by using the Hunch APIs. A taste graph can be made, such as by a Hunch API. The taste graph need not be graphic, but can be electronic and can be used only by the social mobile shopping system. The taste graph can be textual or graphic and can be displayed to the user, such as to make purchase decision and/or to prioritize purchases.

The user device 120 can be an Android cellular telephone, for example. A user can provide authorization to access the user's shopping task list, such as via a cached Android authentication token in the Android phone. The shopping task list can be used to determine what products the user would like to purchase. Other accessible list can similarly be access and used to determine what products the user would like to purchase.

According to an embodiment, a powerful travel planner can combine the user's shopping needs with their personal travel plans. Thus, a user can more efficiently combine travel with shopping. The travel planner can efficiently pick and merge the relevant POS store locations with shopping suggestions that are in route to the user's destination based on the user's priority shopping needs and wish list items. Thus, a travel route that combines the user's personal travel with the user's shopping needs can be defined by the social mobile shopping system. The shopping route can be catered by POS brick and mortar stores, such PayPal POS stores and PayPal Offline Merchant Stores. Such planning can spare the user the onus of planning a separate trip to fulfill the user's shopping needs.

According to an embodiment, the map can be tagged on the go. The map can react dynamically to changes in the user's affinity for a product and/or the availability of the product. For example, if the user performs a new Goggle search for a product that has not been considered by the social mobile shopping system, then an affinity for that product can be determined. If the affinity is greater than the predetermined amount, then the availability of the product can be determined. If the product is available near the user or along a route for a trip of the user, then a location for purchasing the product can be tagged on the map.

Customized voice alerts can be provided for the products in which the user interested. For example, when a new product and purchasing location is determined by the social mobile shopping system, the user can be provided with a voice alert that announces the product and location. Driving directions to the nearest POS store can be provided. For example, the map, voice alerts, and the driving directions can be provided by the user's mobile device.

According to an embodiment, the user can provide authorization for the social mobile shopping system to posts details of the user's shopping, such as via the social mobile shopping system. For example, the social mobile shopping system can post details of the user's shopping on the user's Facebook Wall. The details of the user's shopping can be posted on the user's Facebook Wall using the Facebook Check-in API, for example. The details of the user's shopping can include the name of the POS store/terminal. Thus, the user and the user's friends can track purchases made by the user via the social mobile shopping system.

According to an embodiment, a placeholder can be provided. The placeholder can be for an extensible feature to "Reserve Item(s)" available in the POS terminal using PayPal Access. For example, PayPal Access can be used to enter the priority list for hot deals and perform a store pickup According to an embodiment, a "Buy Item(s)" feature can facilitate buying of one or more items by the user simply by clicking the product suggestion on the map. The item can then be held by the merchant for pick up by the user or can be shipped to the user. For example, the user can pick up the purchased item in one of the stores along the route during travel. The route can be provided, at least in part, via the travel planner.

The social mobile shopping system can provide substantial exposure of a payment provider, such as PayPal, Inc. to POS brick-and-mortar merchants. Such exposure can have the benefit of increasing the use of payment provider services offered by the payment provider to POS brick-and-mortar merchants.

The social mobile shopping system can provide substantial exposure of participating merchants to potential customers. Such exposure can have the benefit of potentially increasing sales for the participating merchants. For example, the social mobile shopping system can provide substantial exposure of PayPal and/or eBay Merchant's Offline Stores to potential customers. The potential customers can be attracted them through the personalized recommendations of products provided by the social mobile shopping system for the POS brick-and-mortal stores. Further, the social mobile shopping system can potentially convert a consumer to a payment provider customer by motivating the user to sign up for payment provider POS service via the social mobile shopping system app.

The social aspect of the app can create enhanced visibility and buzz, which in turn can attract more people to shop at desired locations, such as PayPal POS stores. For example, as products are identified for potential purchase by the user and/or as products are purchased by the user, others (such as other users and/or other members of social networks) can be notified of the potential purchases and purchases by one or more social networks, by email, by text messaging, by automated voice mail, or by any other suitable means.

The social mobile shopping system app can function across the globe. Thus, the social mobile shopping system app potentially can entice a user in one country to travel to another country. For example, the social mobile shopping system app operating in one country can attract traffic to POS terminals in other countries. The social mobile shopping system can cooperate with a travel agency to provide shopping/travel excursions. For example, a travel agent can plan a tour for an individual or family. The travel agent can use the social mobile shopping system to plan shopping stop along the route of the tour.

The social mobile shopping system app can be integrated with other, existing apps. For example, the social mobile shopping system app can be integrated with the PayPal Mobile App to provide a personalized and unified shopping experience for customers by attracting them to the desired merchants, such as merchants of PayPal POS Outlets.

Thus, potential customers, e.g., users, can be attracted to particular POS outlets by leveraging existing assets, such as payment provider assets. Payment provider assets and/or online seller assets, such as information obtained from prior sales, can be mined to determine what products a user may interested in. For example, a user who has purchases a racquet ball racket and balls is like to require new racquet balls at some point in thereafter.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, automotive repair, haircuts, digital music, and books.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   one or more memories storing information regarding searches performed by a user;
   one or more processors operable to:
      access the information regarding searches;
      mine the information regarding searches to identify products;
      determine an affinity of the user for at least one of the products;
      determine an availability of the products having an affinity greater than a predetermined amount; and
      send a communication for display on a user device including the availability of the products having the affinity greater than the predetermined amount.

2. The system of claim 1, wherein determining the affinity comprises using a personalized recommendation API.

3. The system of claim 1, wherein determining the availability comprises using a product availability API.

4. The system of claim 1, wherein the availability is for products sold by merchants within a predetermined area.

5. The system of claim 1, wherein:
   the processor(s) are further operable to determine a location of the user from a GPS of a user mobile device; and
   the availability is for products sold by merchants within a predetermined distance of the location of the user.

6. The system of claim 1, wherein the processor(s) are further operable to:
   determine a route for a trip of the user; and
   wherein the availability is for products sold by merchants along the route.

7. The system of claim 1, wherein the processor(s) are further operable to obtain a shopping task list of the user from the user's mobile device.

8. A method comprising:
   storing, in one or more memories, information regarding searches performed by a user;
   accessing, electronically via one or more processors, the information regarding searches;
   mining, electronically via the processor(s), the information regarding searches to identify products;
   determining, electronically via the processor(s), an affinity of the user for each of the products;
   determining, electronically via the processor(s), an availability of the products having an affinity greater than a predetermined amount; and
   sending, electronically via the processor(s), a communication for display on a user device including the availability of the products having the affinity greater than the predetermined amount.

9. The method of claim 8, wherein determining the affinity comprises using a personalized recommendation API.

10. The method of claim 8, wherein determining the availability comprises using a product availability API.

11. The method of claim 8, wherein the availability is for products sold by merchants within a predetermined area.

12. The method of claim 8, wherein:
   the processor(s) are further operable to determine, electronically via the processor(s), a location of the user from a GPS of a user mobile device; and
   the availability is for products sold by merchants within a predetermined distance of the location of the user.

13. The method of claim 8, wherein the processor(s) are further operable to:
   determine, electronically via the processor(s), a route for a trip of the user; and
   wherein the availability is for products sold by merchants along the route.

14. The method of claim 8, wherein the processor(s) are further operable to obtain a shopping task list of the user from the user's mobile device.

15. A computer program product comprising a non-transitory computer readable medium having computer readable and executable code for instructing one or more processors to perform a method, the method comprising:
- storing information regarding searches performed by a user;
- accessing the information regarding searches;
- mining the information regarding searches to identify products;
- determining an affinity of the user for each of the products;
- determining an availability of the products having an affinity greater than a predetermined amount; and
- sending a communication for display on a user device including the availability of the products having the affinity greater than the predetermined amount.

16. The computer program product of claim 15, wherein determining the affinity comprises using a personalized recommendation API.

17. The computer program product of claim 15, wherein determining the availability comprises using a product availability API.

18. The computer program product of claim 15, wherein the availability is for products sold by merchants within a predetermined area.

19. The computer program product of claim 15, further comprising:
- determining a location of the user from a GPS of a user mobile device; and
- wherein the availability is for products sold by merchants within a predetermined distance of the location of the user.

20. The computer program product of claim 15, further comprising:
- determining a route for a trip of the user; and
- wherein the availability is for products sold by merchants along the route.

21. The computer program product of claim 15, further comprising obtaining a shopping task list of the user from the user's mobile device.

* * * * *